United States Patent
Carbrey

[15] 3,653,030

[45] Mar. 28, 1972

[54] SWITCHED DIVIDER PCM CODERS AND DECODERS

[72] Inventor: Robert Lawrence Carbrey, Boulder, Colo.

[73] Assignee: Bell Telephone Laboratories, Incorporated, Murray Hill, N.J.

[22] Filed: Apr. 3, 1970

[21] Appl. No.: 25,519

[52] U.S. Cl. ................................340/347 AD, 340/347 DA

[51] Int. Cl. ..................................................H03k 13/10

[58] Field of Search.....................340/347; 235/154; 333/14; 179/15.55

[56] References Cited

UNITED STATES PATENTS

| | | | |
|---|---|---|---|
| 3,354,452 | 11/1967 | Bard et al. | 340/347 |
| 3,462,759 | 8/1969 | Hoffman | 340/347 |
| 3,056,085 | 9/1962 | James et al. | 340/347 X |
| 3,453,615 | 7/1969 | Scott | 340/347 |

OTHER PUBLICATIONS

A. K. Susskind, " Notes on Analog-Digital Conversion Techniques" 1957, pp. 5-35 to 5-38.

*Primary Examiner*—Maynard R. Wilbur
*Assistant Examiner*—Charles D. Miller
*Attorney*—R. J. Guenther and E. W. Adams, Jr.

[57] ABSTRACT

A plurality of weighted impedances is used in a switched divider configuration to produce self-compressing PCM encoders and self-expanding PCM decoders. For the encoders, the analog sample voltage is used as a reference voltage and the divider voltage is compared with a zero volt decision level for subsequent switch operation. For the decoders, a DC reference is used, and after the switches have been set in response to digital information, the divider voltage represents an analog sample voltage.

1 Claims, 6 Drawing Figures

INVENTOR
R. L. CARBREY
BY David P. Kelley
ATTORNEY

SWITCHED DIVIDER PCM CODERS AND DECODERS

BACKGROUND OF THE INVENTION

This invention relates to the nonlinear conversion of analog signals and pulse code modulation signals, one to the other. In particular, the nonlinear coding utilized is volume compression and expansion, i.e., companding.

In pulse code modulation (PCM), a combination of several discrete levels, known as quantum levels, is assigned to each of the analog signal samples to be encoded. That is, in the amplitude range within which the analog signals may fall, certain specific levels which are multiples of a basic quantum unit are designated as quantum levels. In other words, the assignment of a quantum level to a particular analog sample corresponds to the assignment of a block of quantum units. In the encoding procedure, an appropriate set of quantum levels is sequentially assigned to the analog signal sample such that, when the quantum levels are combined, they yield an approximation of the sample. Thus, each PCM word comprises a group of digital ones and zeros which represent the presence or absence of the particular quantum levels in the coded sample.

Obviously, in approximating an analog signal, a coding process which assigns combinations of blocks of predetermined size contains a certain amount of inherent coding error. In PCM, this coding error produces an effect which is commonly known as quantizing noise. If the quantum levels are chosen at regular intervals through the signal amplitude range, the percentage error will not be constant for samples of all sizes; clearly, larger signals can tolerate rather large quantizing noise figures while maintaining a reasonable percentage of error, while smaller signals yield a greater percentage of error for comparable quantizing noise levels. Thus, it is desirable to keep the signal to quantizing noise ratio at a fairly constant relative maximum over the signal range. It is evident that a judicious choice of quantum levels will, on the average, accomplish this goal.

One such method for reduction of quantizing noise is called volume compression and expansion, or companding. In companding, quantum levels in the small signal range are more numerous than in the larger amplitude ranges; that is, they are compressed in the smaller signal range. The express purpose of companding is the maximization of the average signal to quantizing noise ratio over the amplitude range. In this manner, quantizing noise is rather evenly distributed on a percentage basis and is relatively minimized. It is noteworthy that companding is an inherently nonlinear process, with the prevalent companding functions being either logarithmic or hyperbolic functions.

Traditionally, companded PCM systems have featured discrete compressing and encoding units at their transmitting ends as well as discrete decoding and expanding units at their receiving ends. Recently, however, a class of PCM systems has been developed in which the compression and encoding units are combined into a self-compressing encoder and the decoding and expanding units are combined into a self-expanding decoder. One particular example of such an arrangement is shown in U.S. Pat. No. 2,889,409 of R.L. Carbrey, in which there is disclosed a self-companding hyperbolic coder using a feedback amplifier.

The present invention, a PCM converter which is made up of a weighted switched impedance divider, is also a member of the class of self-companding converters. However, converters which embody the principles of the present invention require no amplifiers, and are decidedly simpler in structure than much of the prior art. Moreover, since the analog sample value is used as a reference voltage, the need for separate reference voltage sources is eliminated.

In an illustrative embodiment of the invention, each of a plurality of weighted impedances are switched between a reference voltage (the analog sample voltage) and a scaling bias voltage to obtain a hyperbolic companding characteristic. A decision circuit periodically compares the intermediate divider voltage with a 0 volt decision level and further alters the impedance configuration for subsequent comparison.

It is a feature of the present invention that a weighted impedance voltage divider is switched in accordance with a binary code to generate a hyperbolic compression characteristic. In addition, automatic scaling provides an optimum match to the signal level in a composite instantaneous and syllabic compandor.

These and other features of the present invention will be more readily apparent when taken in conjunction with the following detailed description.

DETAILED DESCRIPTION

Figure 1:
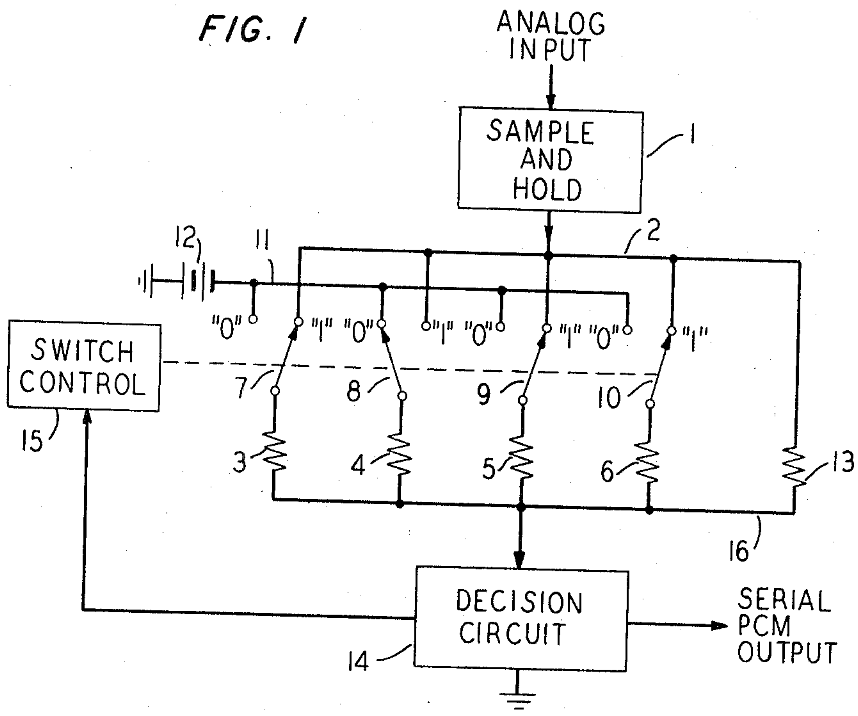
FIG. 1 is an illustrative embodiment of a resistive version of a PCM encoder which embodies the principles of the present invention.

Turning first to FIG. 1, we see a self-compressing PCM encoder which embodies the principles of the present invention. The analog signal is received by a sample and hold circuit 1, and an analog sample is transmitted to a reference bus 2. A plurality of resistors 3, 4, 5, and 6 is connected by single pole double throw switches 7, 8, 9, and 10 to a scaling bus 11 which is biased to some negative voltage by scaling bias voltage source 12. A fixed resistor 13 is also connected to the reference bus 2. A decision circuit 14 monitors the voltage at one side of the resistors 3, 4, 5, 6, and 13, periodically compares the voltage thereon with a 0 volt decision level, and emits a digital PCM output signal in response to the comparisons. In addition, the PCM signals are transmitted to a switch control network 15 which, in turn, operates switches 7 through 10.

The basic principle upon which the embodiment of FIG. 1 operates is that of a voltage divider. The voltage to be divided is the analog sample voltage provided by the sample and hold circuit 1, and the elements which are to comprise the divider are switched resistors 3 through 6, along with fixed resistor 13. Thus, the operation of switches 7 through 10, under the control of the switch control network 15, determines the configuration of the switched divider, the output voltage being sensed at node 16. It is convenient to designate the two resistors of a voltage divider as $R_{top}$, connected between the source and the output node, and $R_{bottom}$, connected between the output node and ground. For example, if switches 7 through 10 are as shown in FIG. 1, the sample and hold voltage will be divided over the parallel combination of resistors 3, 5, 6, and 13 as $R_{top}$ and resistor 4 as $R_{bottom}$. According to the well-known means for calculating voltage division, then, the output voltage at node 16 may be described as $$V_{out} = -V_b + \frac{R_{bottom}}{R_{bottom} + R_{top}} (V_s + V_b) = -V_b + \frac{R_{par}}{R_4 + R_{par}} (V_s - V_b) \quad (1)$$

where $V_{out}$ is the voltage at node 16, $V_s$ is the voltage at the reference bus 2, $R_{par}$ is the resistance of the parallel combination of resistors 3, 5, 6, and 13, $R_4$ is the resistance of resistor 4, and $V_b$ is the scaling bias voltage 12. Thus, the operation of switches 7 through 10, by changing the divider voltage at node 16, changes the input to the decision circuit 14.

Figure 4:
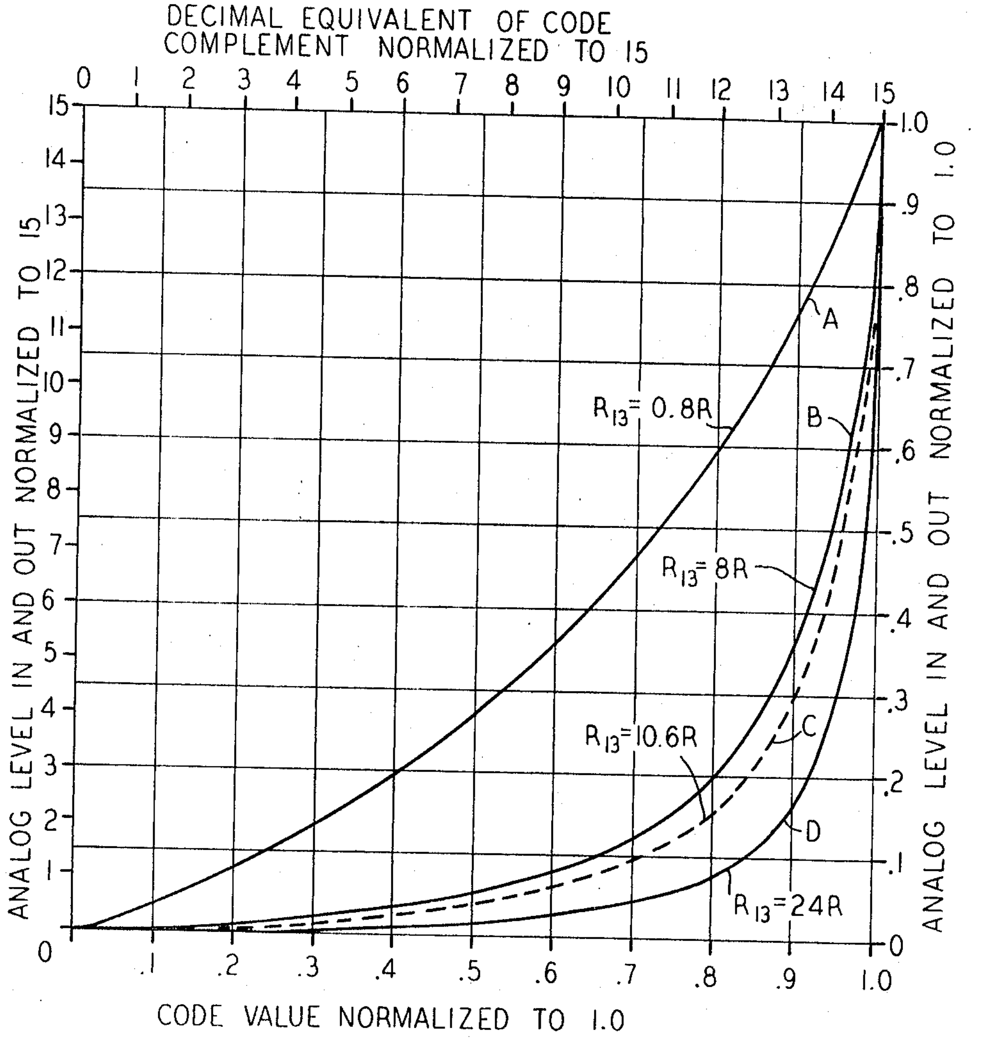
FIG. 4 is a graph showing the effect of changing some component values in the embodiment of FIG. 1.

The values for the resistances and for the unit bias voltage are chosen as follows. A hyperbolic characteristic is obtained if resistors 3, 4, 5, and 6, respectively, are valued at $R$, $2R$, $4R$, and $8R$, where $R$ is some unit resistance value. Additional resistors may be added to accommodate additional digits, of course, by choosing their resistances according to the hyperbolic progression $$R(n) = 2^{(n-1)}R$$

when $n$ corresponds to the added digit position. It is the choice of the value of resistor 13 which determines the shape of the companding characteristic. This will be more apparent when FIG. 4 is discussed hereinafter. The unit scaling bias 12 is chosen so that the divider voltage ($V_{out}$, according to Equation 1) equals zero when all switches are set to the 0 positions of FIG. 1. This switch configuration corresponds to the "maximum" encoded sample. For the four digit code shown, this maximum division is one-sixteenth of the total voltage appearing across the divider. If the scaling bias is taken as a normalized 1 volt, the sample voltage $V_s$ will be a normalized 15 volts. At this limit $$V_{out} = -V_b + R_{bottom}/(R_{top} + R_{bottom})\ (V_s + V_b) = -1 + \text{one-sixteenth}\ (15 + 1) = 0 \qquad 2$$

The operation of the embodiment of FIG. 1 proceeds as follows. First, the analog input signal is sampled by the sample and hold circuit 1. This analog sample voltage is retained by the sample and hold circuit 1 until all digits of the PCM output word are synthesized. Initially, each of switches 7 through 10 are placed in the 1 position (connected to the reference bus 2). To begin the synthesis of the first digit, switch 7 is switched to the 0 position. Thus, the first division voltage sensed by decision circuit 14 consists of the sample voltage plus the scaling bias voltage divided over a bottom resistance ($R_{bottom}$) comprising resistor 3 and a top resistance ($R_{top}$) comprising the parallel combination of resistors 4, 5, 6, and 13. If the voltage at node 16 is then zero volts or less, the decision circuit 14 emits a pulse, or a digital 1 and switches resistor 3 back to the reference bus 2 by switching switch 7 back to the 1 position. Otherwise, it emits no pulse, or a digital 0 and resistor 3 remains in the 0 position for the remainder of the coding cycle. The synthesis of the second PCM digit is then begun by switching resistor 4 to the scaling bus 11 by switching switch 9 to its 0 position. The bottom resistance then comprises either resistor 4 or the parallel combination of resistors 3 and 4, depending on the results of the synthesis of the first digit. The decision circuit then makes another comparison of the voltage at node 16 with the 0 volt decision level. Once more, if the division voltage at node 16 is zero or less, a digital 1 is emitted, and if the division voltage is greater than zero, a 0 is emitted. In response to the second PCM digit, switch control network 15 operates switch 8 to the 1 position or leaves it in the 0 position in the same manner as it had previously operated switch 7. This procedure of resistor switching, voltage division, comparison-decision, signal emission, and further switch control is repeated once for each output digit to be synthesized. Whenever all PCM output digits have been emitted, all switches are returned to their 1 positions to begin encoding the next analog sample.

Figure 2:
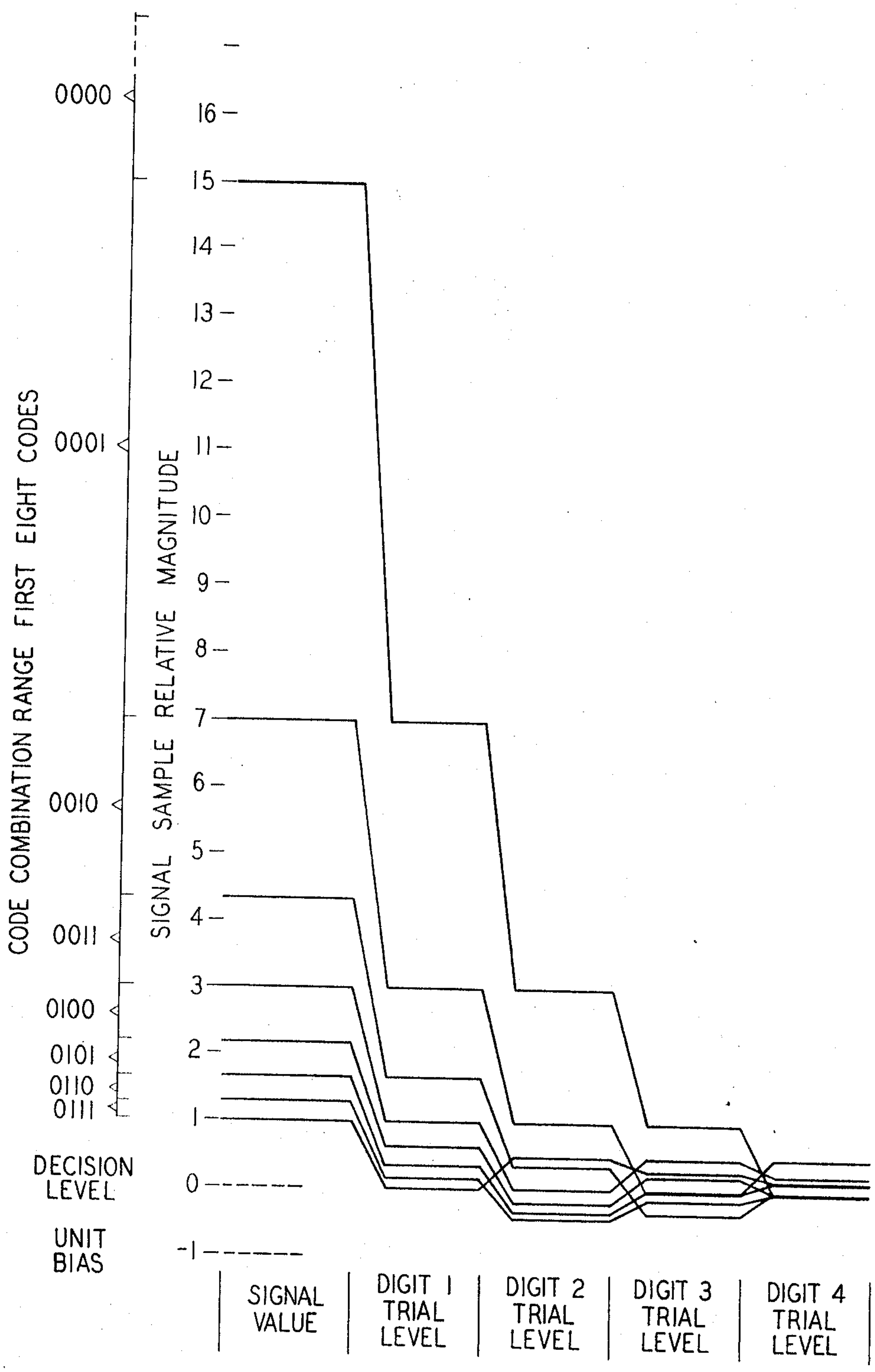
FIGS. 2 and 3 are diagrams of the encoding characteristics associated with the embodiment of FIG. 1.
Figure 3:
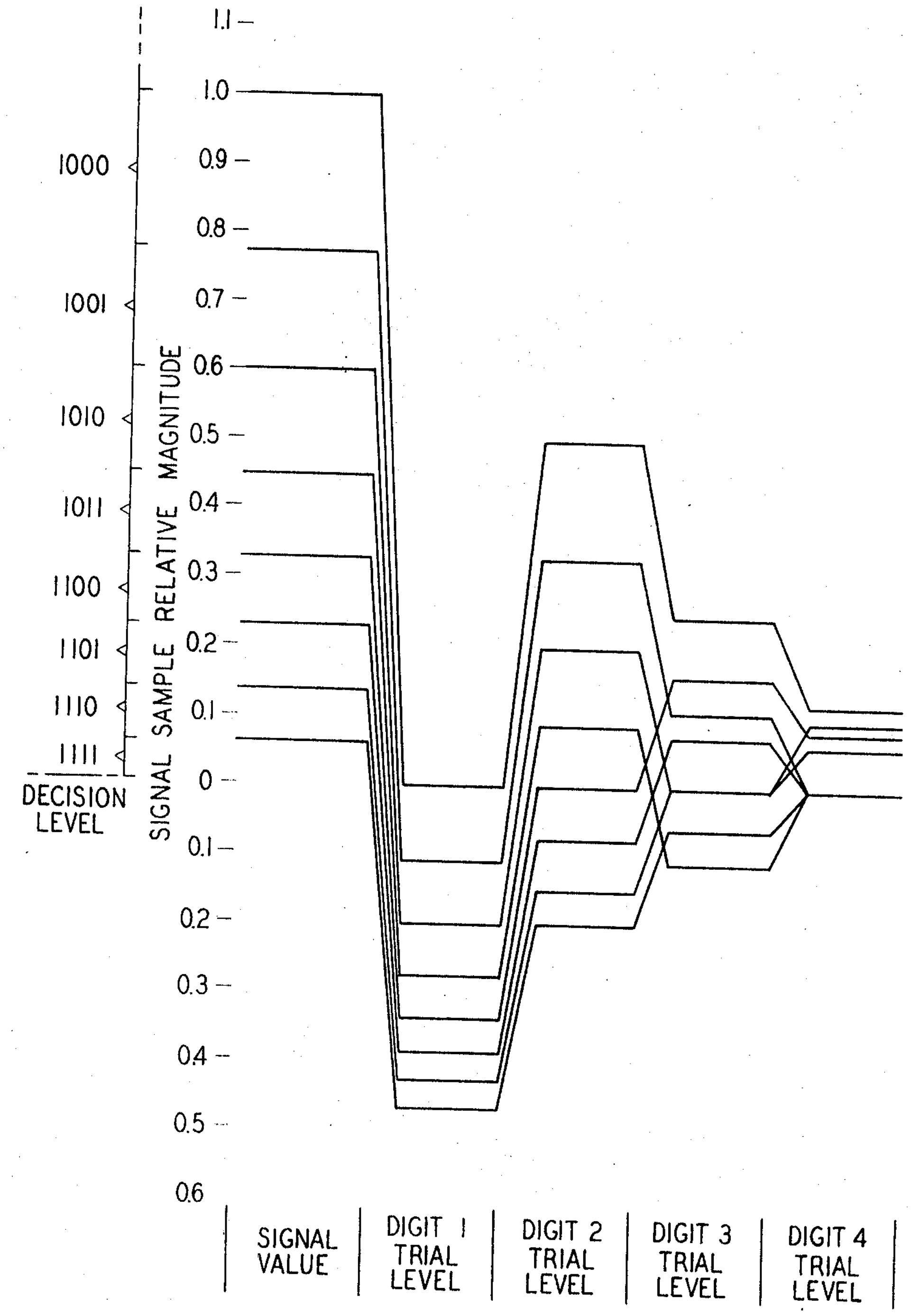

The previously described operation of the encoder of FIG. 1 may be more clearly understood when considered in conjunction with FIGS. 2 and 3. Both FIGS. 2 and 3 show in diagrammatic form the synthesis of all possible PCM output words. In particular, FIG. 2 shows the synthesis of the output words for signal samples of normalized magnitude greater than one, and FIG. 3 shows the synthesis of output words for normalized sample magnitudes of less than 1. The ordinate in both FIGS. 2 and 3 designates the signal sample magnitudes as normalized to the scaling bias voltage source 12, and the corresponding digital code words are shown on an axis parallel to the ordinate. The abscissa in both figures represents the passage of time, with the digit trials appropriately indicated. Although these figures show the encoding arrangement for a four digit code, the principles of the present invention may be easily expanded to any desired number of digits.

The charts of FIGS. 2 and 3 may be interpreted as follows. The plotted lines represent the demarcation lines between quantization levels. Thus, any sample which occurs in the space between two adjacent quantization levels will be encoded as the corresponding PCM word shown on the left margin. For example, signal samples of normalized value between 7 and 15 will be encoded as 0001 and samples between 0.6 and 0.77 will be encoded as 1001. As each digit trial for a given sample is completed, the digits are synthesized by comparing the divided sample with a 0 volt decision level. Thus, it may be seen from the diagram that individual samples are encoded as 1's only when their quantization range is below the 0 volt decision threshold. For example, all sample magnitudes shown in FIG. 3 have a relative magnitude of 1.0 or less and therefore are equal to or less than 0 volts when offset by the scaling bias. Thus, all have a 1 as their first digit.

The effect of companding may be readily appreciated from the charts of FIGS. 2 and 3. Obviously, the smaller signal samples are allocated many more quantization levels than are the larger samples. This is apparent merely by comparing the samples of FIG. 2 with the samples of FIG. 3. Such a comparison reveals that as many levels are allocated to the 0 to 1 range as are allocated to the 1 to 15 range. In this manner, the signal to quantizing noise ratio is kept at a relative maximum over the signal range.

Still another feature of the present invention, its adaptability, may be seen from the graph of FIG. 4. FIG. 4 shows a plot of normalized analog voltage vs. normalized code value for varying values of resistor 13 (R13). In particular, curves for resistor 13 values of 0.8$R$, 8$R$, 10.6$R$i and 24$R$ are designated by curves A, B, C, and D, respectively. The amount of compression is seen to increase for increasing values of resistor 13.

Figure 5:
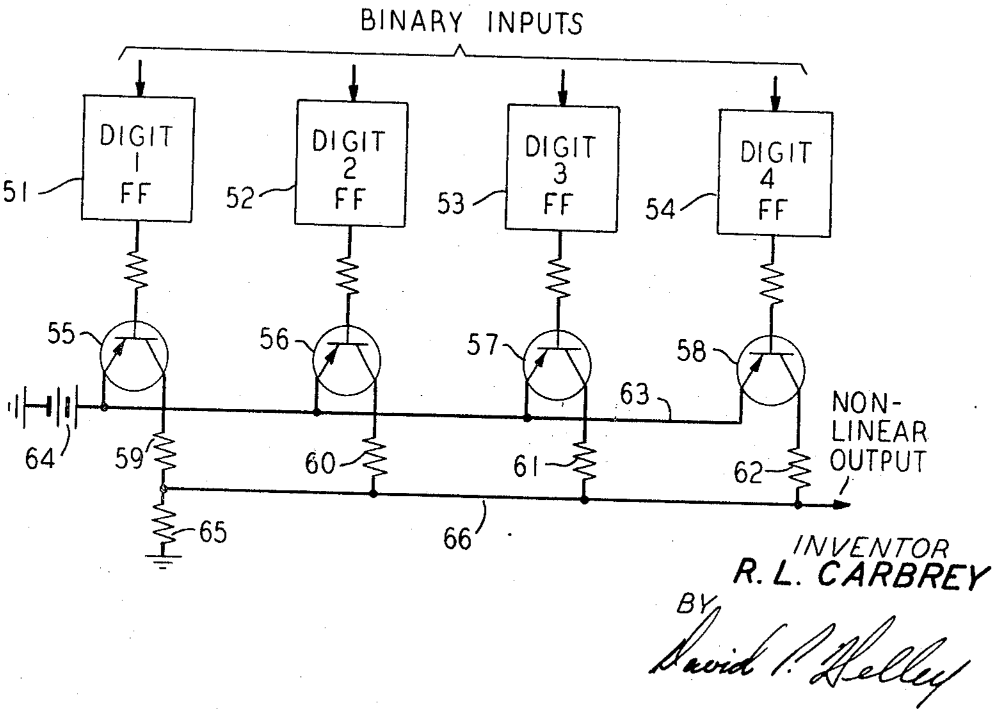
FIG. 5 is an illustrative embodiment of a PCM decoder which embodies the principles of the present invention.

Heretofore, the discussion has concerned itself only with PCM encoders which embody the principles of the invention. FIG. 5 shows a resistive version of a PCM decoder which embodies the principles of the invention. It is worthy of note that the decoder of FIG. 5 is essentially a parallel decoder in that it is capable of receiving all of the input digits simultaneously and producing the analog sample voltage immediately therefrom. Briefly, the decoder of FIG. 5 contains four individual digit flip-flops 51, 52, 53, and 54 which in turn operate switches 55, 56, 57 and 58 under the control of the corresponding input digits. Although the switches 55 through 58 are shown embodied as PNP transistors, they may well be embodied as any of the other well-known switching apparatus such as field effect transistors or NPN transistors. Each of the switches shown connects one of resistors 59, 60, 61, and 62 to a reference bus 63 which is held at a reference voltage by means of reference voltage source 64. The other sides of resistors 59 through 62 are tied at output node 66 to resistor 65, which in turn is connected to ground.

The operation of the decoder of FIG. 5 proceeds as follows. When the representative digits are received by the digit flip-flops 51 through 54, the corresponding switches 55 through 58 are opened or closed, depending upon whether the associated digit is a 1 or a 0. Thus, a voltage divider configuration is created, with the top resistance ($R_{top}$) of the divider being the parallel combination of whichever of resistors 59 through 62 are connected to the reference bus 63, and with the bottom ($R_{bottom}$) being resistor 65. The value of resistors 59 through 62 and 65 is chosen to correspond to the nonlinear quantizing characteristic, with the value of resistor 65 determining the degree of compression. Thus, the voltage which appears at node 66, which is the reference voltage from source 64 divided over the previously described divider, corresponds to the analog sample output voltage. Each time a new binary input word is received by the digit flip-flops 51 through 54, a different analog sample voltage is produced similarly at node 66. Once more, the principles of the invention may be extended to more than four digit codes by simply adding extra resistors, switches and switch control circuits.

The principles of the invention have been thus far illustrated only in their resistive embodiments. However, the principles of the invention are equally applicable to capacitive PCM encoders and decoders.

Figure 6:
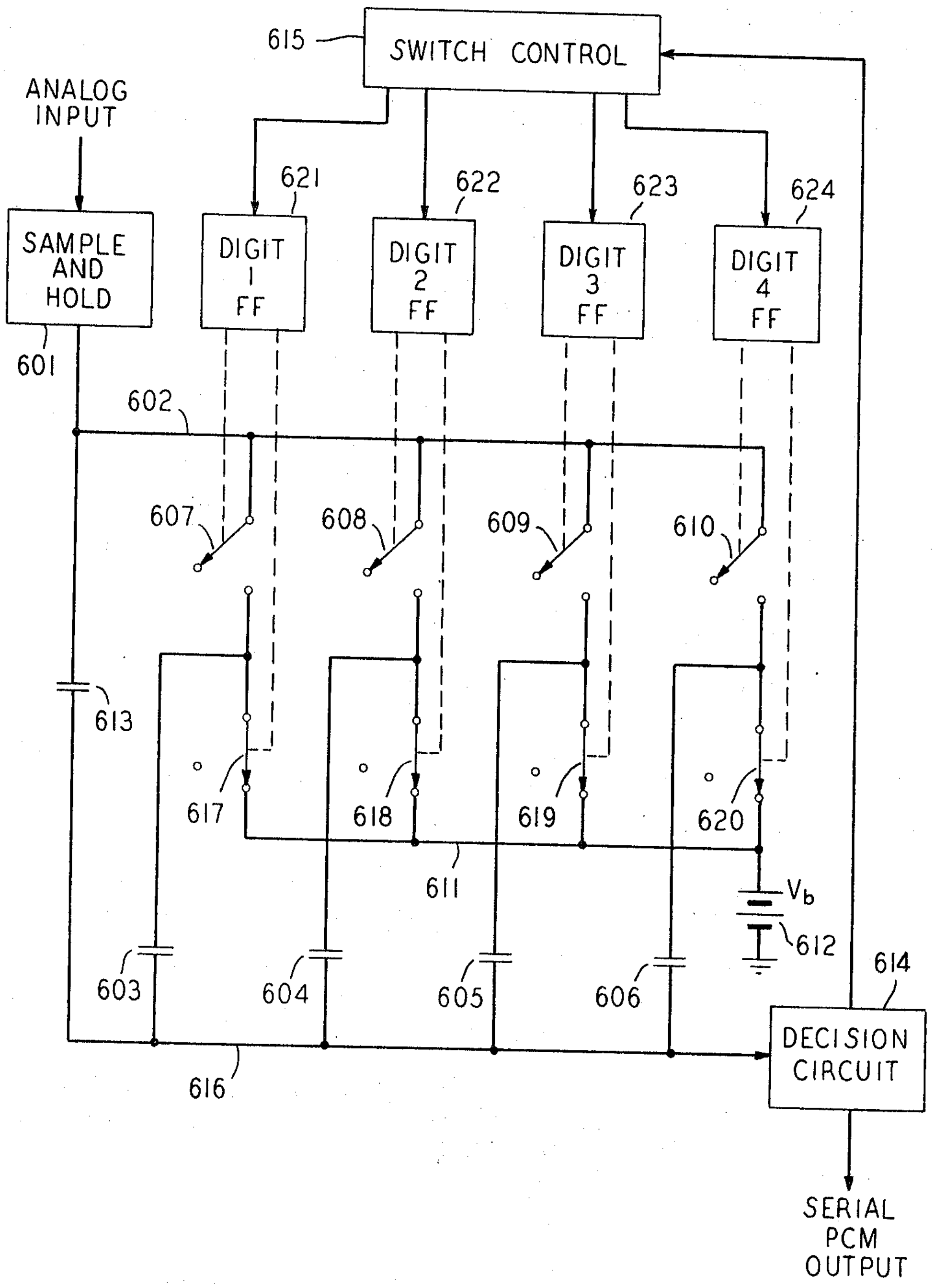
FIG. 6 is an illustrative embodiment of a capacitive divider PCM encoder which embodies the principles of the present invention.

A PCM encoder featuring a capacitive switched divider is shown in FIG. 6. The analog input is sampled by sample and hold circuit 601 and the samples are transferred to reference bus 602. A plurality of capacitors 603, 604, 605, and 606 are each connected by switching means 607, 608, 609, and 610 to the reference bus 602, and by switches 617, 618, 619, and 620 to a ground bus 611 which is held at some negative voltage by a scaling bias source 612. Switches 607 through 610 and 617 through 620 correspond in operation to the single-pole double-throw switches 7 through 10 in FIG. 1. Thus, when the voltage at divider node 616 is compared by the decision circuit 614 with a 0 volt reference level and serial PCM output signals are emitted in response to the comparisons, a switch control network 615 operates switches 607 through 610 and 617 through 620 in a complementary mode by means of digit control flip-flops 621, 622, 623, and 624.

The operation of the capacitive embodiment of FIG. 6 is very similar to that of the resistive embodiment shown in FIG. 1. In fact, the only significant difference between the resistive and capacitive embodiments of the invention is the weighting schemes. This difference stems from the fact that resistors in parallel add reciprocally while capacitors in parallel add directly. Thus, while resistors 3 through 6 of FIG. 1 representing output digits $2^1$ through $2^4$ were valued at *R*, 2*R*, 4*R*, and 8 *R*, respectively, the corresponding capacitors 603 through 606 must be valued at 8C, 4C, 2C and *C*, respectively, where *C* is some unit capacitance. Once more, the value of the fixed element, capacitor 613 in this case, controls the degree of compression. It is noteworthy that the capacitive versions operate on a charging voltage basis, whereas the resistive versions operate on a current flow basis. From the aspect of the voltage division output, however, the two versions of the invention operate in the same manner.

The encoder of FIG. 6 may be changed to a capacitive PCM decoder embodying the principles of the invention by making only a few changes. If sample and hold circuit 601 is removed and is replaced by a steady state reference voltage source of appropriate size and decision circuit 614 and scaling bias 612 are removed from the arrangement of FIG. 6, a decoding operation may be obtained. All that needs to be done is to deliver the PCM data to be converted directly to the switch control network 615. The switches 607 through 610 and 617 through 620 are operated by flip-flops 621 through 624, similar to the aforementioned coding operation, and the divider voltage at node 616 corresponds to the analog sample output.

The foregoing embodiments are intended to be illustrative of the application of the principles of the invention. Numerous other arrangements will occur to workers skilled in the art without departing from the spirit and scope of the invention.

What is claimed is:

1. In a system which utilizes analog type signals and digital type signals at different points therein, an encoder for converting samples of the analog type signals into digital words of N digits comprising:

a first capacitor having a terminal on each side of it, the magnitude of said first capacitor determining the spacing of successive quantum levels of said encoder;

means for coupling the analog samples to a first terminal on a first side of said first capacitor;

a plurality of capacitors each connected on one side to a second terminal on a second side of said first capacitor, each being associated with a different digit of the digital word, a first one of said plurality of capacitors being valued at a unit capacitance C and the other of said plurality of capacitors being multiples of the unit capacitance, the multiples being related by the progression $C_k = 2^k c$, *k* being an integer between 1 and N;

a reference voltage source, negative in polarity with respect to the analog samples and having a magnitude equal to $^{V}max/2^N$, $V_{max}$ being the maximum anticipated analog sample size, said reference voltage source determining a point on the analog sample range above and below which one half the quantum levels occur;

a plurality of switching means, each individually switching one terminal of one of said plurality of capacitors between said reference voltage source and said first terminal of said first capacitor;

means for determining whenever the voltage of said second terminal of said first capacitor is zero volts or less;

and means, responsive to said means for determining, for operating said plurality of switching means.--.

* * * * *